United States Patent
Matsunaga et al.

(10) Patent No.: US 7,583,884 B2
(45) Date of Patent: Sep. 1, 2009

(54) REFRACTIVE INDEX MATCHING TAPE ADHERING DEVICE

(75) Inventors: Tadao Matsunaga, Shizuoka (JP);
Masayoshi Suzuki, Shizuoka (JP);
Nobuhiro Hashimoto, Shizuoka (JP);
Kimio Nakano, Shizuoka (JP)

(73) Assignee: Tomoegawa Co., Ltd., Tokyo (JP)

( * ) Notice: Subject to any disclaimer, the term of this patent is extended or adjusted under 35 U.S.C. 154(b) by 0 days.

(21) Appl. No.: 11/790,395

(22) Filed: Apr. 25, 2007

(65) Prior Publication Data
US 2007/0280617 A1 Dec. 6, 2007

(30) Foreign Application Priority Data
Apr. 28, 2006 (JP) .............................. 2006-126752

(51) Int. Cl.
*G02B 6/00* (2006.01)
(52) U.S. Cl. ...................................... 385/134; 385/147
(58) Field of Classification Search ......... 385/134–137, 385/147
See application file for complete search history.

(56) References Cited
U.S. PATENT DOCUMENTS
4,608,894 A 9/1986 Lee et al.
5,825,404 A 10/1998 Konno
2007/0086707 A1* 4/2007 Suzuki et al. ................. 385/58

FOREIGN PATENT DOCUMENTS
| EP | 1 686 402 A1 | 8/2006 |
| GB | 2 137 961 A | 10/1984 |
| JP | 2000-298224 | * 10/2000 |
| JP | 2005-274839 | 10/2005 |
| KR | 2005-34769 A | 4/2005 |

OTHER PUBLICATIONS

Chung M. et al., "Development of a Multichannel Fiber-to-Fiber Optical Connector for the D0 Upgrade Tracker," Jun. 1996, IEEE Transactions on Nuclear Science, vol. 43, No. 3, pp. 1153-1156.

* cited by examiner

*Primary Examiner*—Kevin S Wood
(74) *Attorney, Agent, or Firm*—Oliff & Berridge, PLC

(57) ABSTRACT

A refractive index matching tape adhering device easily handles a refractive index matching film. The adhering device has a refractive index matching tape adhering portion which can be adhered by stretching the refractive index matching tape. In the adhering device having a refractive index matching tape supplying portion, a refractive index matching tape adhering portion, and a refractive index matching tape collecting portion, the refractive index matching tape adhering portion has a pair of tape supporting members which can stretch the refractive index matching tape and a cradle which holds the refractive index matching tape in the adhering.

11 Claims, 5 Drawing Sheets

REFRACTIVE INDEX MATCHING TAPE ADHERING DEVICE

BACKGROUND OF THE INVENTION

1. Field of the Invention

The present invention relates to a refractive index matching tape adhering device used for optical connection.

2. Description of Related Art

As a connection method for optical fibers, methods are commonly used in which optical fibers, or ferrules into which optical fibers are inserted, are physically connected by joining. As a part for connecting, for example, a mechanical splice, an optical connector, or the like, can be used, and in general, in the case in which the part is used in a semi-permanent type connection, the mechanical splice can be effectively used, whereas in the case in which the part will be frequently connected and disconnected, the optical connector can be effectively used. In the both cases, a physical connection is carried out by pressing end faces of the optical fiber in an axial direction thereof, and in the case of the optical connector, the optical fiber is inserted in a ferrule so as to protect it since it is usually fragile, and a physical connection of the end faces of the optical fiber can thereby be carried out.

In this physical connection, connection characteristics are greatly influenced by positioning accuracy and the shape of the edge of the optical fiber. For example, in the case in which the angle of an edge is shifted or the shape of an edge is uneven, air is present between the edges of the joined optical fibers, and Fresnel reflection is increased at connection edges, and therefore, connection loss is increased. In particular, connection losses may be substantially increased in multicore optical connectors.

Various methods for overcoming this problem have heretofore been researched. For example, in Japanese Unexamined Patent Application Publication No. 2005-274839, a structure is proposed in which a transparent refractive index matching film having adhesive characteristics is directly mounted to an edge of an optical fiber.

An adhering process for a conventional refractive index matching film will be explained with reference to FIG. 5.

FIG. 5 is used to explain the case in which only optical fiber is used; however, the case in which optical fibers are connected using support materials, such as a ferrule, may also be similarly explained.

Reference numeral 1 indicates an optical fiber, and reference numeral 2 indicates a refractive index matching film.

As shown in FIGS. 5A and 5B, an optical fiber 1 is moved relative to a refractive index matching film 2 until an edge of the optical fiber 1 adheres to the refractive index matching film 2. Then, as shown in FIG. 5C, a part of the refractive index matching film 2 is separated in a state in which it is adhered to an edge of the optical fiber 1 using the adhesive characteristics of the refractive index matching film 2, by moving the optical fiber in a reverse direction, and the refractive index matching film 2 can be provided only at the edge of the optical fiber 1.

However, there are problems in that the refractive index matching film 2 having adhesive characteristics is easily contaminated by fine dust, oil from the hands, or the like, and in that handling is difficult in adhering.

In the present invention, a construction using a refractive index matching oil may be used for the same object; however, a construction in which the refractive index matching film is directly adhered is preferable, since the reliability of environmental resistance decreases over time, and in the case of the refractive index matching oil, is lower than that of the case of the refractive index matching film.

SUMMARY OF THE INVENTION

The present invention was attained by considering the above problems, and an object thereof is to provide a refractive index matching tape adhering device for that easily handles a refractive index matching film.

The present invention solves the above problems by the following technical constructions.

(1) A refractive index matching tape adhering device of the present invention has a refractive index matching tape adhering portion that can be adhered by stretching the refractive index matching tape.

(2) A refractive index matching tape adhering device according to the above refractive index matching tape adhering device (1) has at least one of a refractive index matching tape supplying portion which supplies the refractive index matching tape, and a refractive index matching tape collecting portion which collects the refractive index matching tape.

(3) A refractive index matching tape adhering device according to the above refractive index matching tape adhering device (1) or (2), in which the refractive index matching tape adhering portion has cutting blades which cut the refractive index matching tape.

(4) A refractive index matching tape adhering device of the present invention has a refractive index matching tape adhering portion, a refractive index matching tape supplying portion, and a refractive index matching tape collecting portion, in which the refractive index matching tape adhering portion has a pair of tape supporting members which can stretch the refractive index matching tape, and a cradle that holds the refractive index matching tape in the adhering.

(5) A refractive index matching tape adhering device according to the above refractive index matching tape adhering device (4), in which the refractive index matching tape adhering portion further has a pair of cutting blades, and a positioning member having positioning holes is provided so as to be close to the stretched refractive index matching tape.

(6) A refractive index matching tape adhering device according to any one of the above refractive index matching tape adhering devices (1), (2), (4) and (5), in which the refractive index matching tape contains a refractive index matching film and protective films provided on both surfaces of the refractive index matching film.

(7) A refractive index matching tape adhering device according to the above refractive index matching tape adhering device (2) or (4), in which the refractive index matching tape supplying portion has a tape unwinding portion.

(8) A refractive index matching tape adhering device according to any one of the above refractive index matching tape adhering devices (2), (4) and (7), in which the refractive index matching tape supplying portion has a removing member which removes the protective film from the refractive index matching film.

(9) A refractive index matching tape adhering device according to the above refractive index matching tape adhering device (2) or (4), in which the refractive index matching tape collecting portion has a tape winding portion.

(10) A refractive index matching tape adhering device according to any one of the above refractive index matching tape adhering devices (2), (4) and (9), in which the refractive index matching tape collecting portion has a controlling portion for winding which includes a click mechanism or a ratchet mechanism.

According to the present invention, a refractive index matching tape adhering device that easily handles a refractive index matching film can be provided.

Thus, adhering at high places, narrow places, or the like, which was difficult in the past, can also be carried out easily. In addition, work efficiency can also be improved.

Furthermore, according to the present invention, a refractive index matching tape adhering device which can continuously adhere the refractive index matching film without contamination immediately after removing a protective film and which can position more accurately, can be provided.

DESCRIPTION OF THE PREFERRED EMBODIMENTS

Figure 1:
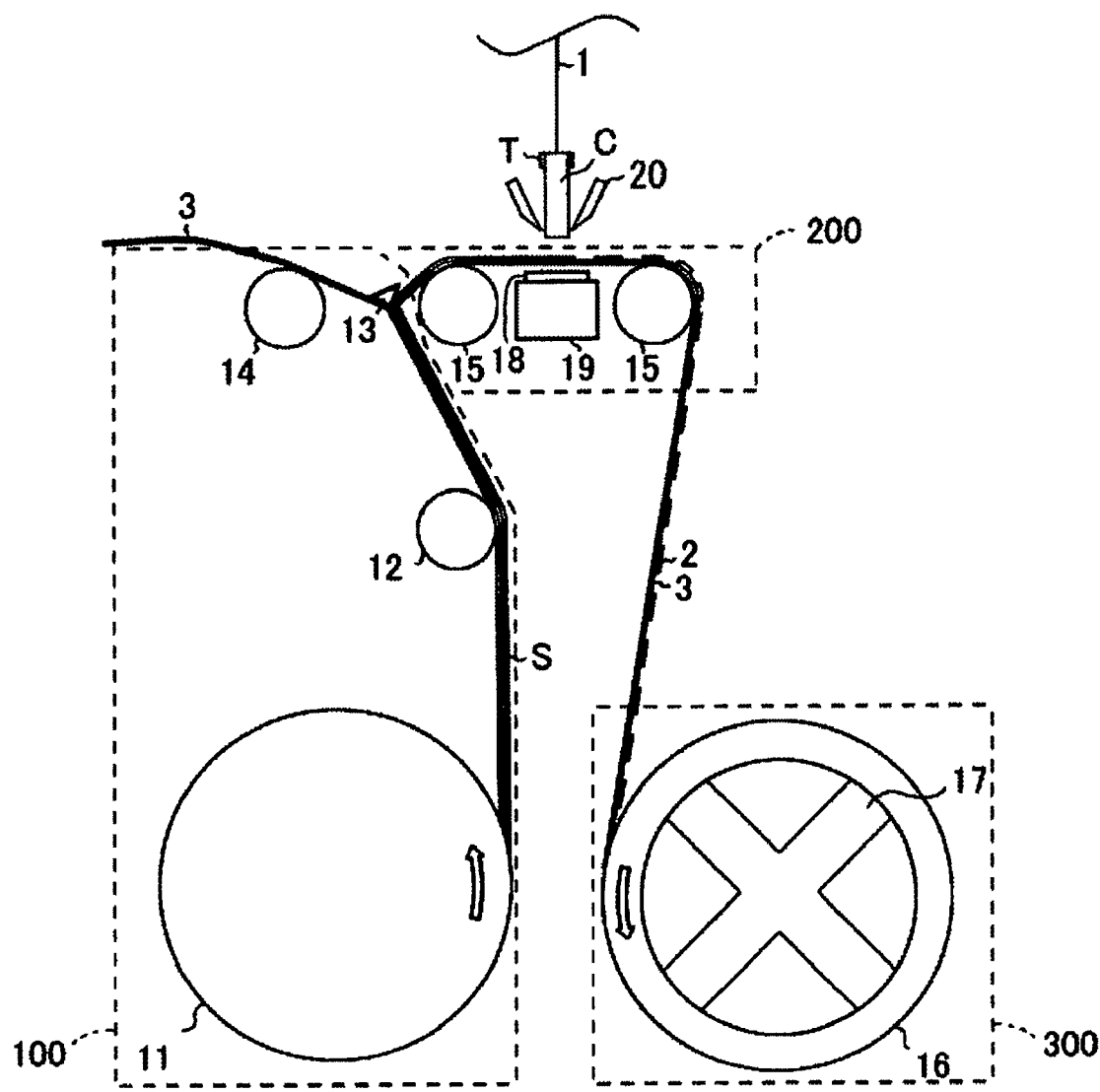
FIG. 1 is a schematic drawing showing the refractive index matching tape adhering device of the present invention.

First, a construction of the refractive index matching tape adhering device of the present invention as shown in FIG. 1 will be explained.

FIG. 1 is a schematic drawing showing the refractive index matching tape adhering device of the present invention which adheres the refractive index matching tape at an end face of an optical connector.

Reference numeral 100 indicates a refractive index matching tape supplying portion which supplies a refractive index matching tape S with a tape unwinding portion 11, etc., and it is preferable to have a tape feeding guide roller 12, a removing member 13, and a discharging roller 14. Reference numeral 200 indicates a refractive index matching tape adhering portion that has a pair of tape supporting members 15 and adheres the refractive index matching tape S by stretching on the tape supporting members 15, and has a cradle 19 between a pair of tape supporting members 15. In this case, it is preferable that a receiving pad 18 be provided at the cradle 19. Reference numeral 300 indicates a refractive index matching tape collecting portion which collects the refractive index matching tape S with a tape winding portion 16, etc., and it is preferable to have a controlling portion 17.

Reference numeral 1 indicates an optical fiber, reference numeral 2 indicates a refractive index matching film, reference numeral 3 indicates a protective film, reference numeral 11 indicates a tape unwinding portion such as a roller, etc., reference numeral 12 indicates a tape feeding guide roller, and reference numeral 13 indicates a removing member in which the refractive index matching film 2 is exposed by removing the protective film 3 from the refractive index matching film 2 and which is a triangular elongated member. In addition, the present invention may have a constitution in which the protective film 3 is removed by adjusting bending strength, rigidity, bending angles of the refractive index matching tape S, etc., without the removing member 13.

Reference numeral 14 indicates a discharging roller which discharges the protective film 3 to the outside, reference numeral 15 indicates a pair of tape supporting members such as rollers, etc., which stretch the refractive index matching film 2 thereon, reference numeral 16 indicates a tape winding portion such as a roller, etc., reference numeral 17 indicates a controlling portion for winding such as a click (detent) mechanism, a ratchet mechanism, etc., reference numeral 18 indicates a receiving pad having elasticity, reference numeral 19 indicates a cradle which holds the refractive index matching film 2 during adhering, and reference numeral 20 indicates a pair of two cutting blades which cuts off the refractive index matching film 2 so as to adjust the size of members to be connected.

Reference letter C indicates an optical connector, reference letter S indicates a refractive index matching tape in which the protective films 3 are laminated on both surfaces of the refractive index matching film 2, and the reference letter T indicates a collar portion of the optical connector C. Here, an outline arrow is a rotating direction of the tape unwinding portion 11 and the tape winding portion 16.

In the refractive index matching tape adhering device shown in FIG. 1, the tape feeding guide roller 12 and the removing member 13 are provided, in this order, downstream of the tape unwinding portion 11.

Then, the downstream of the removing member 13 is divided into two groups, and the discharging roller 14 in which the removed protective film 3 is fed is provided to one group and the pair of tape supporting members 15 in which the refractive index matching film 2 and the protective film 3 are fed is provided to the other group.

The cradle 19 with the receiving pad 18 is provided between the pair of tape supporting members 15.

The tape is set on the receiving pad 18, the pair of two cutting blades 20 is provided thereon, and the optical connector C is inserted through between the cutting blades 20.

The tape winding portion 16 with the controlling portion 17 is provided downstream of the pair of tape supporting members 15.

Next, operation of the refractive index matching tape adhering device of the present invention shown in FIG. 1 will be explained.

First, the refractive index matching tape S, which was unwound from the tape unwinding portion 11, is fed to the removing member 13 through the tape feeding guide roller 12. Then, the refractive index matching film 2, in an exposed state in which the protective film 3 is removed from the surface by the removing member 13, is fed to the pair of tape supporting members 15.

Here, the protective film 3 removed from the surface is discharged to the outside by the discharging roller 14.

The refractive index matching tape S sent to the pair of tape supporting members 15 is stretched between the pair of tape supporting members 15.

Then, the optical connector C is brought into contact with the refractive index matching tape S from the upper portion and is adhered.

Furthermore, the optical connector C and the refractive index matching film 2 can be securely adhered using the elasticity of the receiving pad 18 by joining the optical connector C to the receiving pad 18 with the refractive index matching tape S and by pressing and adhering between the optical connector C and the cradle 19.

The refractive index matching film 2 is cut off along the outline of the optical connector C by the cutting blades 20, and the refractive index matching film 2 can be adhered only at an edge thereof by pulling the optical connector C back upward.

Subsequently, the refractive index matching film 2 which is not used, and the protective film 3 on the back surface, are wound by a tape winding portion 16.

At this time, in the case in which the film is wound only by a desired amount by the controlling portion 17, the refractive index matching film 2, which is not contaminated immediately after removing the protective film 3 from the surface, is always stretched between the pair of tape supporting members 15, and it can be continuously adhered.

Figure 2:
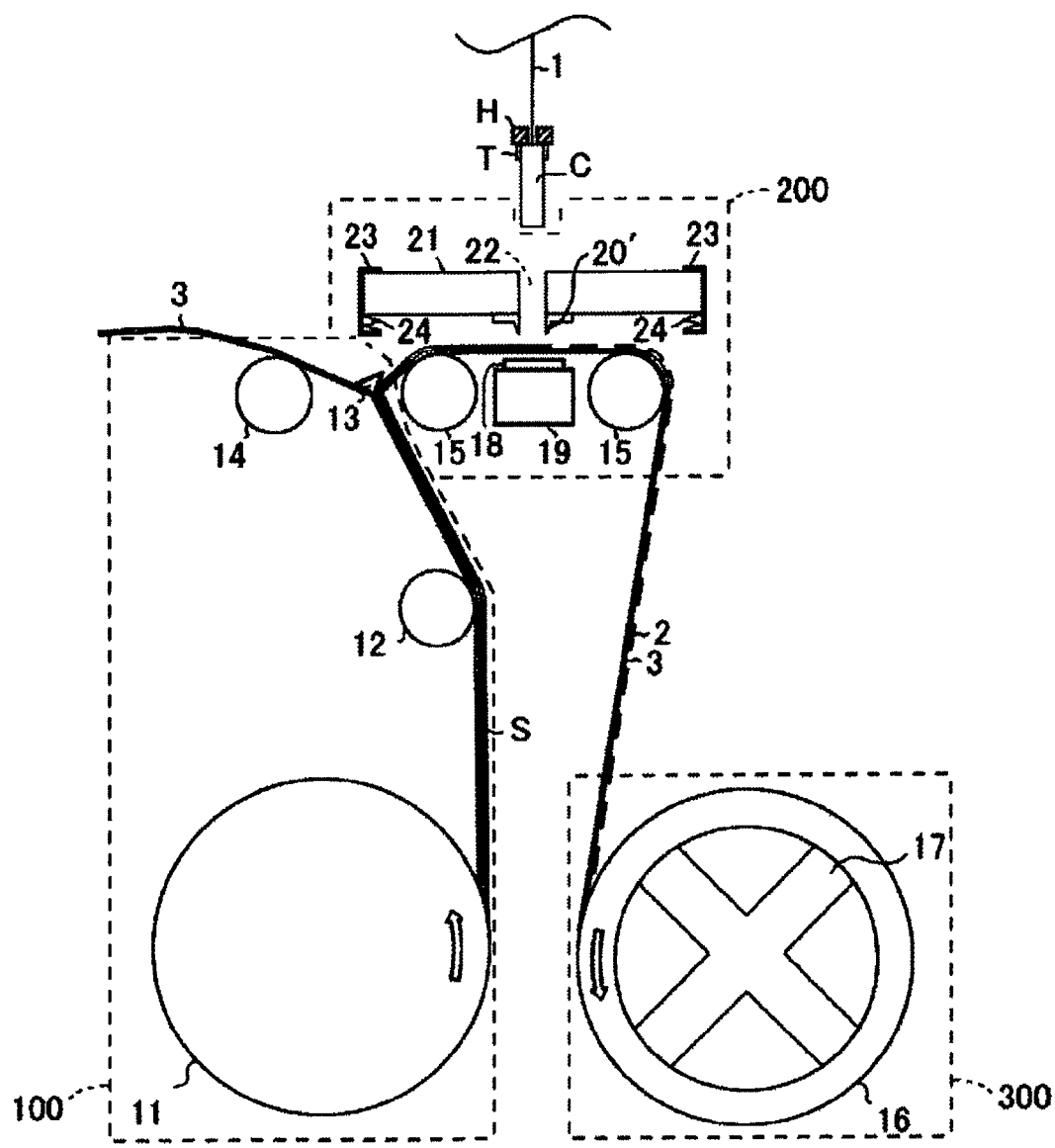
FIG. 2 is a schematic drawing showing another refractive index matching tape adhering device of the present invention.

Next, another constitution of the refractive index matching tape adhering device of the present invention as shown in FIG. 2 will be explained.

FIG. 2 is a schematic drawing showing another refractive index matching tape adhering device of the present invention.

The refractive index matching tape adhering device shown in FIG. 2 has the same constitution as that of the refractive index matching tape adhering device shown in FIG. 1, except that a positioning member 21, an outside frame 23, an urging-up portion 24, and an urging-out portion H, are provided, and therefore, detailed explanations are omitted and identical reference numerals or letters are appended to identical components.

In FIG. 2, reference numeral 23 indicates an outside frame which can move the positioning member 21 upward or downward within a desired range, and reference numeral 24 indicates an urging-up portion such as a spring, etc., which urges the positioning member 21 upward. Reference letter H indicates an urging-out portion such as a slidable holder, etc., which can urge out or pull back the optical connector C by sliding upward or downward while holding the optical connector C.

Next, the positioning member used for the present invention will be explained with reference to FIG. 3.

Figure 3:
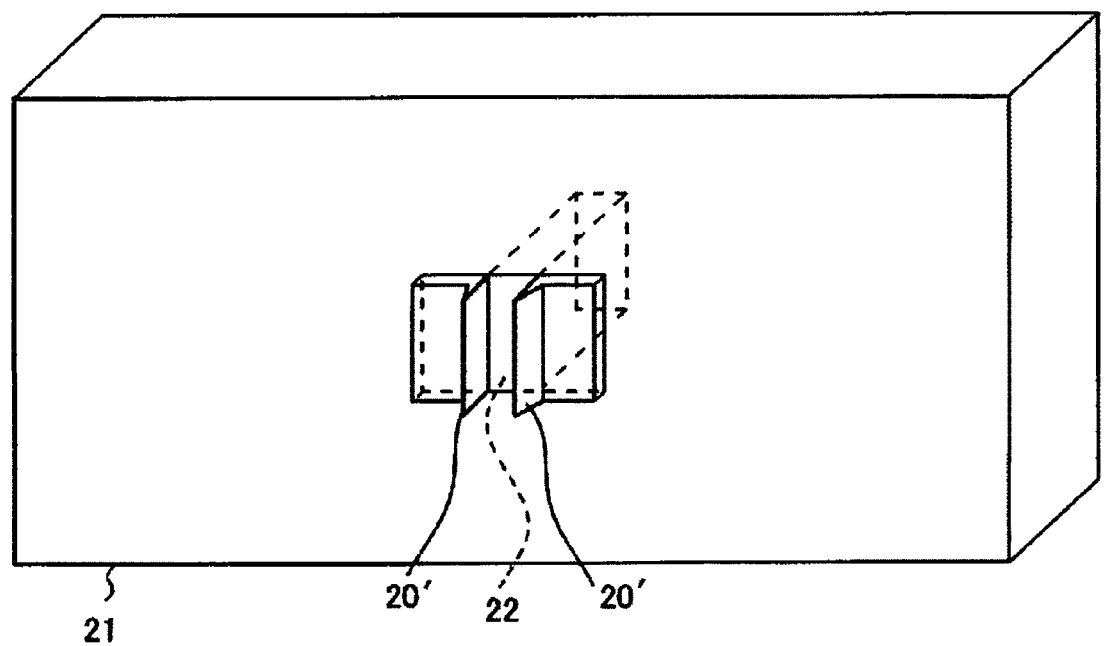
FIG. 3 is a perspective view showing a positioning member.

FIG. 3 is a perspective view showing the positioning member.

In FIG. 3, reference numeral 20' indicates a pair of two cutting blades which cut off the refractive index matching film 2 provided on the edge of a positioning hole. Reference numeral 21 indicates a positioning member that has a positioning hole and positions members to be connected and the refractive index matching film 2, and reference numeral 22 indicates a positioning hole into which is inserted members to be connected.

The positioning member 21 is provided closely, so as to face a surface having the cutting blades 20', to the receiving pad 18 and so as to dispose the refractive index matching tape S therebetween, as shown in FIG. 2. Then, the positioning hole 22 is placed so that the ahead thereof crosses with the refractive index matching tape S.

Here, the positioning member 21 can move upward or downward within the outside frame 23, and it is generally urged up by the urging-up portion 24 and is located on an upper portion in the outside frame 23.

Next, operation of another refractive index matching tape adhering device of the present invention shown in FIG. 2 will be explained.

The operation of the refractive index matching tape adhering device shown in FIG. 2 is in the same manner as that of the above refractive index matching tape adhering device shown in FIG. 1, except for adhering of the optical connector C and the refractive index matching film 2, and therefore, detailed explanations about these same operations are omitted.

A process for adhering between the optical connector C and the refractive index matching film 2 will be explained in detail with reference to FIG. 4.

FIG. 4 is a schematic drawing showing a process for adhering of the refractive index matching film.

In the figures, the arrows indicate the movement direction of the optical connector C.

Figure 4A:
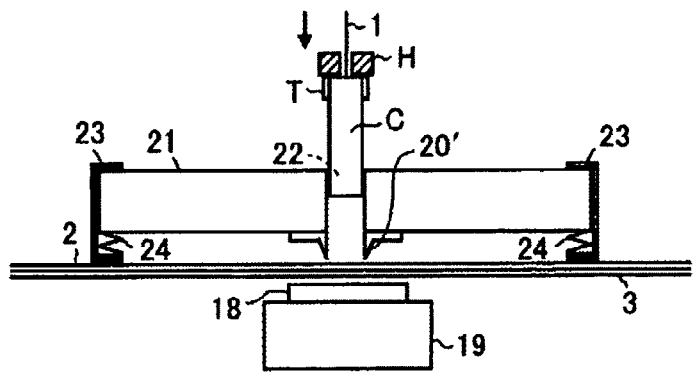
FIG. 4 is a schematic drawing showing a process for adhering of a refractive index matching film of the present invention.

First, as shown in FIG. 4A, the optical connector C held in the urging-out portion H is inserted and is urged out from an upper portion to the positioning hole 22, and it is perpendicularly brought close to the refractive index matching tape S.

Figure 4B:
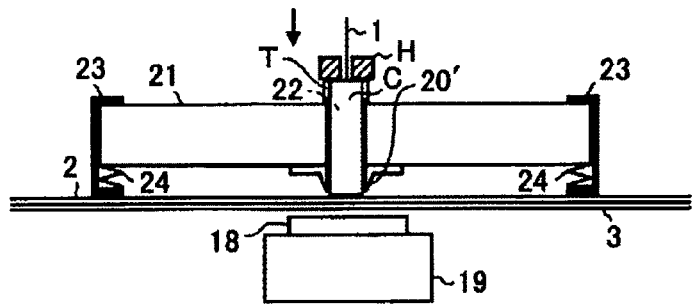

Next, as shown in FIG. 4B, the optical connector C is brought into contact with the refractive index matching tape S by further urging out and is adhered. Here, it is preferable that a collar portion T of the optical connector C be joined to the positioning member 21.

Figure 4C:
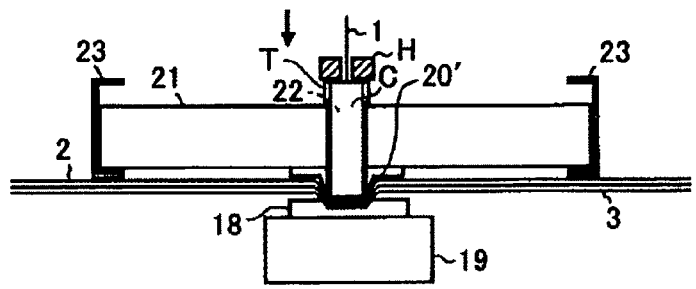

Then, as shown in FIG. 4C, the optical connector C is joined to the receiving pad 18 with the refractive index matching tape S by further urging out, and the optical connector C and the refractive index matching film 2 are securely adhered using the elasticity of the receiving pad 18 by pressing and adhering between the optical connector C and the cradle 19. At the same time, the collar portion T pushes the positioning member 21 downward, the urging-up portion 24 is shortened, and the cutting blades 20' provided in the positioning member 21 thereby come into contact with the refractive index matching film 2.

A cut fitted to a width of the optical connector C is made in the refractive index matching film 2 by the cutting blades 20'. In this time, the cutting blades 20' are adjusted so as not to cut off the protective film 3, even if the positioning member 21 moves to the lowest position of the outside frame.

Figure 4D:
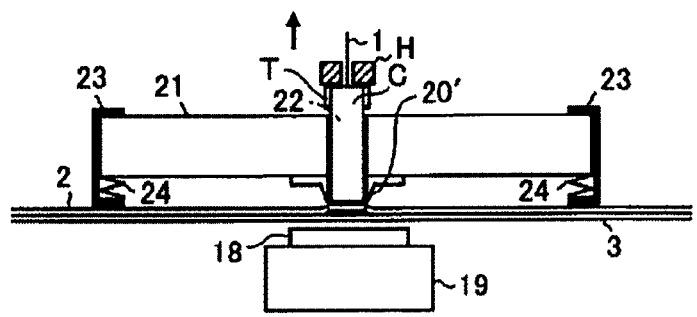

Next, as shown in FIG. 4D, in the case in which the optical connector C held in the urging-out portion H is pulled back upward, the refractive index matching film 2 is separated from the protective film 3 which is on the back surface and is floated up, since the optical connector C and the refractive index matching film 2 are adhered and the cut fitted to a width of the optical connector C is made in the refractive index matching film 2.

Figure 4E:
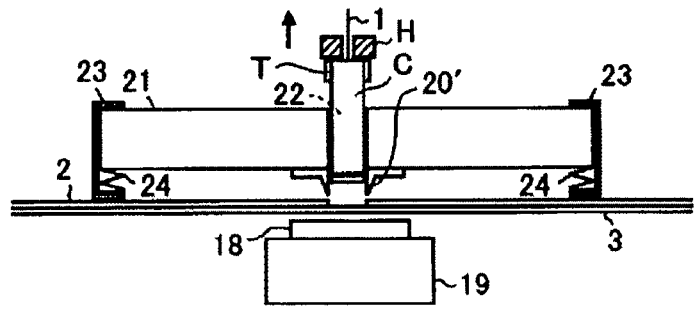
Figure 5A:
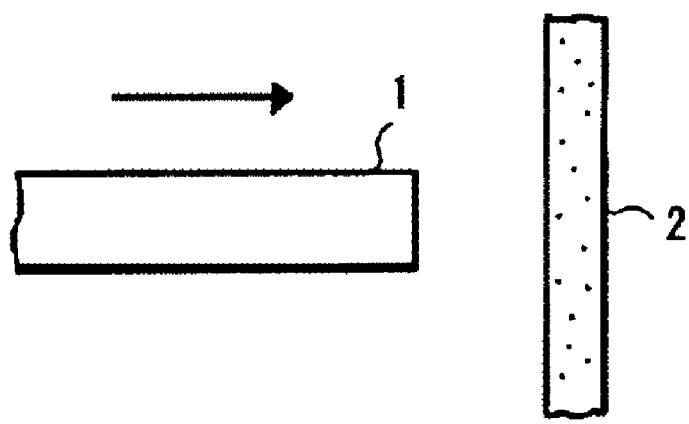
FIG. 5 is a schematic drawing showing a process for adhering a conventional refractive index matching film.
Figure 5B:
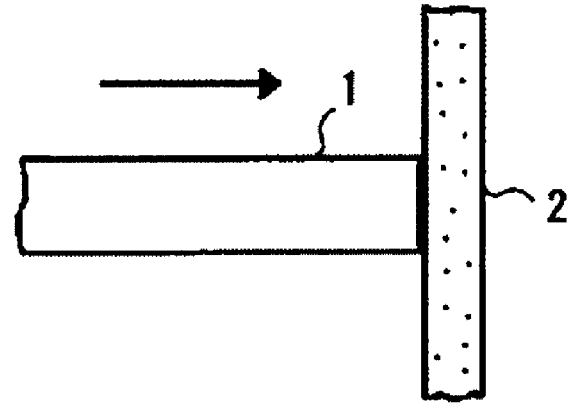
Figure 5C:
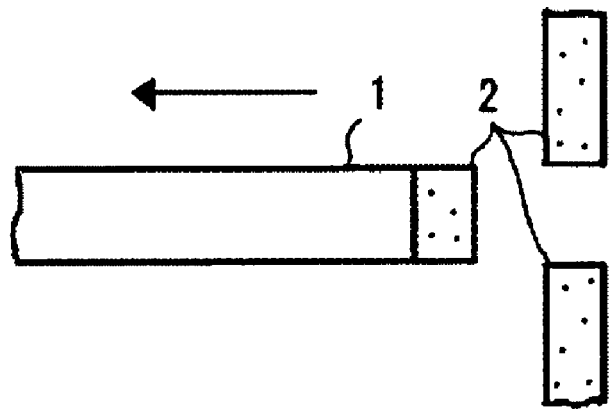

Then, as shown in FIG. 4E, by further pulling the optical connector C held in the urging-out portion H back upward, the refractive index matching film 2 and the protective film 3 are perfectly removed, and the refractive index matching film 2 can be adhered only at an edge of the optical connector C.

When the optical connector C is pulled back upward, the refractive index matching film 2 can be easily cut and adhered only at an edge of the optical connector by holding a state in which the position of the cutting blades 20' is fixed.

The composition of the present invention is not limited only to the above compositions. For example, the cutting edge 20' may be formed so as to be slidable in a surface-inside direction in FIG. 4 and to reliably cut.

In addition, in order to prevent foreign matter, dirt, dust, etc., from penetrating into the positioning hole 22 when not in use, a sealing member such as a cover, etc., may be provided to the positioning member 21.

Next, components used in the present invention will be explained in detail.

As a member to be connected which is used in the present invention, optical fibers, optical fiber arrays having a V-groove, optical waveguides, optical components, or the like, can be used in addition to the above optical connector C. However, the type of member is not so limited, and any member in which light is transmitted can be used. In addition, optical fiber 1 also is not limited in any way, and it may be suitably selected depending on application. For example, optical fiber consisting of a material such as quartz, plastic, etc., can be used. Furthermore, as an optical waveguide, polyimide optical waveguide, PMMA optical waveguide, epoxy optical waveguide, etc., can be used. Additionally, as an optical component, optical lenses, filters, etc., can be used, and the type of the optical component is not limited.

The refractive index matching film 2 used for the present invention may be a member which adheres to an edge of the member to be connected with a moderate degree of tackiness, when it brings into contact with a member to be connected, and it is preferable to have adhesive characteristics. It is more preferable that it be a member that has characteristics for application to and removal from the member to be connected which are suitable, which does not cause cohesive failure, and which does not allow adhering material to remain on a removed member to be connected. Specifically, it is preferable that a film consisting of various adhesives of a high polymer material such as acrylate, epoxy, vinyl, silicone, rubber, urethane, methacrylate, nylon, bisphenol, diol, polyimide, fluoridated epoxy, and fluoridated acrylate, be used in the refractive index matching film 2. Among these, silicone and acrylate can be preferably used from a viewpoint of environmental resistance and adhesion. In addition, by adding crosslinking agents, additives, softening agents, adhesion modifiers, etc., adhesive strength and wettability may be properly adjusted and water resistance, moisture resistance and heat resistance may be provided. Furthermore, these characteristics may be adjusted after adhering the refractive index matching film 2 to an edge of the member to be connected. Here, although some materials have a porous structure, in the case in which the refractive index matching film 2 is pressed by applying moderate pressure during connection, air in the connection portion is decreased and optical loss is also reduced.

It is necessary that the refractive index matching film 2 used for the present invention have refractive index matching characteristics. The "refractive index matching characteristics" means an approximate degree between the refractive index of the refractive index matching film 2 and the refractive index of the member to be connected. The refractive index of the refractive index matching film 2 used for the present invention is not limited, even if it is close to the refractive index of the member to be connected, and it is preferable that differences in the refractive indexes be within ±0.1, and it is more preferable that it be within ±0.05 from the viewpoint of transmission loss by avoiding the Fresnel reflection. In the case in which the difference of refractive index between members to be connected is large, it is preferable that the difference between an average value of the refractive indexes of the members to be connected and the refractive index of the refractive index matching film 2 be within the above range.

In addition, the refractive index matching film 2 used for the present invention may be composed of a single layer, or it may be composed of multiple layers. According to the present invention, the refractive index matching film 2 is difficult to damage even if there are burrs at edges of the members to be connected, edges of two members to be connected can be easily adhered by having appropriate wettability on the surface, and the adhesion to the members to be connected can be maintained by the adhesive strength. Since the refractive index matching film 2 has simultaneously refractive index matching characteristics, superior optical connection can be carried out. Additionally, since it has appropriate wettability and adhesive strength on the surface, it is not necessary to apply excessive pressure in joining the members to be connected, and problems of breaks in or nicking of the members to be connected will not occur. Furthermore, since the refractive index matching film 2 has the adhesiveness, it can be repeatedly used, even if it is frequently connected and disconnected.

In addition, it is preferable that the refractive index matching film 2 have protective films 3 on both surfaces, because it is easily contaminated by fine dust, oil from the hands, etc. According to the present invention, the protective film 3 can be removed without wrinkles or position shifts by the removing member 13, etc., and the refractive index matching film 2 which is not contaminated immediately after removing the protective film 3 from the surface can be used by stretching between a pair of tape supporting members 15.

In the present invention, in the case in which two optical connectors are optically connected, since the refractive index matching film 2 is provided only at edges of the optical connectors C which are joined, it has the same size as that of the edges of the optical connectors C, a maintained range of the refractive index matching film 2 can be extremely decreased, and a very simple structure can be designed.

In the present invention, size or thickness of the refractive index matching film 2 can be properly selected according to specifications. In addition, mounting angle or mounting position of the members to be connected to the refractive index matching film 2 may be properly selected depending on the used members to be connected, and in the case in which the edge of the members to be connected is diagonally cut, the mounting angle may be set to fit to the cut angle.

It is preferable that the initial thickness of the refractive index matching film 2 before joining the members to be connected be within $1\ \mu m \leq t \leq 150\ \mu m$. In the case in which the thickness of the refractive index matching film 2 is thinned to less than $1\ \mu m$, handling is very difficult, and the possibility that the members to be connected will be easily damaged by joining the members to be connected is increased since flexibility is not maintained. In contrast, in the case in which it exceeds $150\ \mu m$, the space between the members to be connected is extremely increased, even if the refractive index matching film 2 was deformed by joining the members to be connected, and the optical loss is increased. It is more preferable that it be $2.5\ \mu m \leq t \leq 100\ \mu m$, and it is most preferable that it be $5\ \mu m \leq t \leq 50\ \mu m$.

In addition, in the case in which the members to be connected are joined and pressed, it is preferable that the thickness of the refractive index matching film 2 be $50\ \mu m$ or less, and it is more preferable that it be $20\ \mu m$ or less, although this depends on the pressure in the joining. In the case in which the thickness after joining exceeds $50\ \mu m$, the space between the joined members to be connected is extremely increased, and the optical loss is increased.

According to the present invention, the refractive index matching film 2 is deformed in the inside, and the edges of the two members to be connected are close to each other, even if the film is too thick. Therefore, initial film thickness of the refractive index matching film 2 can be increased, and the handling of the refractive index matching film 2 becomes very convenient. In addition, the refractive index matching film 2 is deformed in the inside while adhering to the edges of the members to be connected, even if the edges of the joined members to be connected have an inclined angle or the shape of the edges is deformed, and it is difficult for air to intrude between the members to be connected, and optical connection can be carried out at low loss without using polishing techniques. Furthermore, the members to be connected can be stably connected, even if vibration or thermal change is generated in the members to be connected by adhesive strength in the refractive index matching film 2. Additionally, since the refractive index matching film 2 is restored by elasticity even if it is once deformed, the members to be connected to which adheres the refractive index matching film 2 can be repeatedly optically connected, even after being repeatedly applied and removed.

The protective film 3 used for the present invention may be members having strength, which is not cut off until it is sent to a pair of tape supporting members 15, and various flat tapes consisting of metal, paper, polymeric film, or the like, can be used. For example, PET film, kraft paper, glassine paper, OPP film, epoxy resin, polyethylene resin, polystyrene resin, ABS resin, methacrylic resin, polycarbonate, nylon resin, phenol resin, chloroethylene resin, cellulose triacetate, acetal resin, fluoro resin, PPS, polyester, unsaturated polyester, polyimide, copper, aluminum, stainless steel, steel, silicone rubber, chloroprene rubber, nitrile rubber, styrene-butadiene rubber, ethylene propylene rubber, silicone rubber, or the like, can be used. Of these, PET film, OPP film, kraft paper, and glassine paper which is sent to the pair of the tape supporting members 15 and is difficult to spread in stretching, can be preferably used.

It is preferable that releasing agent be applied to the protective film 3 to improve releasability of the refractive index matching film 2, and it is more preferable that the releasing agent, of which the releasing strength differs, be applied to a protective film provided on the front surface and a protective film provided on the back surface. Various releasing agents can be used according to the materials and the strength of the protective film 3, etc., and materials which do not remain on the refractive index matching film 2 after removing are preferable, and specifically, a silicone material for removing, or the like, can be used.

EXAMPLES

In the following, the present invention will be explained in detail by way of Examples.

Example 1

A refractive index matching tape S was prepared by using an acrylic resin plate (thickness of 25 µm) adjusted to a refractive index of 1.46 as a refractive index matching film 2 and using a PET film having a thickness of 50 µm as a protective film 3. Then, it was included in a refractive index matching tape adhering device of the present invention, as shown in FIG. 2.

In addition, two MT connectors for 8 cores (longer edge dimension of 6.4 mm and shorter dimension of 2.5 mm) were prepared as an optical connector C. In the MT connector for 8 cores, an optical fiber tape having 8 cores was included by a typical method, and a connected end face was polished by a typical method.

A width of the refractive index matching tape S was made to be 3 mm by adjusting a width of a portion in which the optical fibers were exposed on the MT connector.

A refractive index matching film 2 was adhered at one edge of the MT connector by the refractive index matching tape adhering device of the present invention which includes the refractive index matching tape S. The refractive index matching film 2 was homogeneously adhered without large burrs. Additionally, edges of the optical fibers were accurately covered with the refractive index matching film 2 by using a positioning portion 21.

The MT connector in which the refractive index matching film 2 was adhered and the other MT connector in which the refractive index matching film 2 was not adhered were fitted by a guide pin and a clip, and in each optical fiber, optical loss was measured and averaged.

In addition, the time required to optically connect was also measured.

Furthermore, the optical connected portion was put into a closed space and was allowed to remain for 1 year, and in each optical fiber, optical loss was measured and averaged. Environmental resistance was evaluated by the following standard. In the case in which the measured average value was 0.2 dB or more higher than that in the state in which it was not allowed to remain for 1 year, this was designated as being unsatisfactory (NG). In the case in which the measured average value was not 0.2 dB higher than that in the state in which it was not allowed to remain for 1 year, this was designated as being superior (Superior).

Example 2

A refractive index matching film 2 was adhered in the same manner as that in Example 1, except that an optical fiber array having 4 cores was used instead of the MT connector having 8 cores.

The optical fiber array in which the refractive index matching film 2 was adhered and the other optical fiber array in which the refractive index matching film 2 was not adhered were joined by adjusting the position of an optical connection, and in each optical fiber, optical loss was measured and averaged.

In addition, the time required to optically connect was also measured.

Furthermore, environmental resistance was also evaluated in the same manner as that of Example 1.

Comparative Example 1

The MT connectors having 8 cores were fitted in the same manner as that of Example 1, except that a refractive index matching oil was applied manually without using the refractive index matching tape adhering device of the present invention, and in each optical fiber, optical loss was measured and averaged.

In addition, the time required to optically connect was also measured.

Furthermore, environmental resistance was also evaluated in the same manner as that of Example 1.

Comparative Example 2

The MT connectors having 8 cores were fitted in the same manner as that of Example 1, except that the refractive index matching film was adhered manually without using the refractive index matching tape adhering device of the present invention, and in each optical fiber, optical loss was measured and averaged.

In addition, the time required to optically connect was also measured.

Furthermore, environmental resistance was also evaluated in the same manner as that of Example 1.

The measured results of the Examples and Comparative Examples are shown in Table 1.

TABLE 1

|  | Average Value of Optical Loss (dB) | Time Required to Work Optical Connection (sec) | Evaluation Resistance |
| --- | --- | --- | --- |
| Example 1 | 0.15 | 10 | Superior |
| Example 2 | 0.14 | 10 | Superior |
| Comparative | 0.16 | 20 | NG |

TABLE 1-continued

| | Average Value of Optical Loss (dB) | Time Required to Work Optical Connection (sec) | Evaluation Resistance |
|---|---|---|---|
| Example 1 Comparative Example 2 | 0.25 | 600 | Superior |

Summary of Results

With respect to the optical loss in Examples 1 and 2, there was no problem in practical use. This means that when the refractive index matching tape adhering device of the present invention was used, the refractive index matching film 2 was adhered so as to be optically homogeneous. In addition, with respect to the time required to work an optical connection and environmental resistance, there were no problems in practical use.

Comparative Example 1 is an example of an optical connection in an MT connector using a refractive index matching oil, which has come to be widely used.

The average values of optical loss in Example 1 and Comparative Example 1 were equal mostly. With respect to the time required to work optical connection, there was a slight difference. However, the environmental resistance was NG, and there was a problem in practical use.

In the refractive index matching film 2 used in Example 1, which is in a solid state, it was difficult to obtain an effect over time, and in contrast, in the refractive index matching oil used in Comparative Example 1 which is in a liquid state, an amount of and physical characteristics of the oil were changed by vibration or contamination by material in the air, and it was easy to obtain an effect over time.

In Comparative Example 1, there was every possibility that overall optical connector C was contaminated by difficulty in adjusting an amount of application (application in a suitable amount) and by surplus oil. In addition, it was inconvenient in practical use that oil, an applicator (such as swab), or the like had to be kept, and connection characteristics and working time were highly variable depending on the technical skill of the workers.

Comparative Example 2 is an example of an optical connection in a conventional MT connector using a refractive index matching film 2.

With respect to the average of optical loss and environmental resistance, there were no problems in practical use. However, when the refractive index matching film 2 was adhered, a period of 600 seconds was required as working time because of the manual work, and there was a problem in practical use.

In Comparative Example 2, there was every possibility that the refractive index matching film 2 was not adhered finely because of inferior workablity, and it was often necessary that the adhering be tried again. In addition, it was inconvenient in practical use that film, tweezers, a loupe, scissors, or the like had to be kept, and connection characteristics and working time were highly variable depending on the technical skill of the workers. Furthermore, in unstable high places, narrow places, place with a lot of dust, dark places, etc., the working time tended to be even longer.

As explained above, according to the present invention, the refractive index matching tape adhering device which easily handles the refractive index matching film 2 is provided.

In addition, the refractive index matching tape adhering device of the present invention has a simple structure and can be miniaturized.

Thus, the refractive index matching tape adhering device can be held and handled with one hand, and adhering at a high place, narrow place, or the like, which was difficult in the past, can also be carried out easily. Therefore, in actual maintenance and construction of optical fiber communication lines, work for optical connections can easily be carried out. In addition, since the adhering is not manual work, the work can be carried out under stable conditions without compensating for the trembling of hands, etc., and the work efficiency is also improved.

In addition, according to the present invention, the refractive index matching tape adhering device that can continuously adhere the refractive index matching film 2, which does not become contaminated immediately after removing a protective film 3, and which can be positioned more accurately, can be provided.

What is claimed is:

1. A refractive index matching tape adhering device comprising:
    a refractive index matching tape adhering portion in which a refractive index matching tape can be adhered to an edge of a member to be connected by stretching; and
    at least one of a refractive index matching tape supplying portion which supplies the refractive index matching tape and a refractive index matching tape collecting portion which collects the refractive index matching tape,
    wherein the refractive index matching tape adhering portion comprises
    a means for bringing the edge of the member to be connected close to the refractive index matching tape, and
    a cutting blade for cutting the refractive index matching tape which is adhered to the edge of the member to be connected, and
    the refractive index matching tape supplying portion includes a removing member which removes a protective film from the refractive index matching tape.

2. A refractive index matching tape adhering device for according to claim 1, wherein the refractive index matching tape comprises:
    a refractive index matching film; and
    protective films provided on both surfaces of the refractive index matching film.

3. A refractive index matching tape adhering device according to claim 1, wherein the refractive index matching tape supplying portion comprises a tape unwinding portion.

4. A refractive index matching tape adhering device according to claim 1, wherein the refractive index matching tape collecting portion comprises a tape winding portion.

5. A refractive index matching tape adhering device according to claim 1, wherein the refractive index matching tape collecting portion comprises a winding controlling portion which includes at least one of a click mechanism and a ratchet mechanism.

6. A refractive index matching tape adhering device comprising:
    a refractive index matching tape adhering portion in which a refractive index matching tape can be adhered to an edge of a member to be connected by stretching;
    a refractive index matching tape supplying portion; and
    a refractive index matching tape collecting portion, in which the refractive index matching tape adhering portion comprises a pair of tape supporting members that can stretch the refractive index matching tape and a cradle that holds the refractive index matching tape in adhering, wherein the refractive index matching tape supplying portion includes a removing member which removes a protective film from the refractive index matching tape.

7. A refractive index matching tape adhering device according claim 6, wherein the refractive index matching tape adhering portion further comprises:

a pair of cutting blades; and a positioning member having positioning holes provided so as to be close to the stretched refractive index matching tape.

8. A refractive index matching tape adhering device according to claim 6, wherein the refractive index matching tape comprises:

a refractive index matching film; and protective films provided on both surfaces of the refractive index matching film.

9. A refractive index matching tape adhering device according to claim 6, wherein the refractive index matching tape supplying portion comprises a tape unwinding portion.

10. A refractive index matching tape adhering device according to claim 6, wherein the refractive index matching tape collecting portion comprises a tape winding portion.

11. A refractive index matching tape adhering device according to claim 6, wherein the refractive index matching tape collecting portion comprises a winding controlling portion which includes at least one of a click mechanism and a ratchet mechanism.

* * * * *